(12) United States Patent
Peitzer et al.

(10) Patent No.: US 10,523,583 B2
(45) Date of Patent: Dec. 31, 2019

(54) MEDIA-AWARE RADIO ACCESS NETWORK PACKET SCHEDULING

(71) Applicants: AT&T Intellectual Property I, L.P., Atlanta, GA (US); AT&T Mobility II LLC, Atlanta, GA (US)

(72) Inventors: Haywood Peitzer, Randolph, NJ (US); James Gordon Beattie, Jr., Bergenfield, NJ (US); Roque Rios, III, Middletown, NJ (US); Stephen Francis Triano, Hillsborough, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 66 days.

(21) Appl. No.: 15/268,263

(22) Filed: Sep. 16, 2016

(65) Prior Publication Data

US 2018/0083886 A1    Mar. 22, 2018

(51) Int. Cl.
| | | |
|---|---|---|
| *H04L 12/917* | (2013.01) | |
| *H04L 29/06* | (2006.01) | |
| *H04N 21/61* | (2011.01) | |
| *H04N 21/647* | (2011.01) | |
| *H04W 72/12* | (2009.01) | |

(52) U.S. Cl.
CPC .......... *H04L 47/76* (2013.01); *H04L 65/1069* (2013.01); *H04N 21/6131* (2013.01);
(Continued)

(58) Field of Classification Search
CPC ... H04L 47/76; H04L 47/365; H04L 65/1069; H04L 65/4069; H04L 47/623; H04L 47/627; H04L 47/50; H04L 47/72; H04L 47/621; H04L 47/6265; H04L 12/14; H04L 12/56; H04L 29/06; H04L 29/08; H04L 47/2491; H04L 12/1439; H04L 47/10; H04L 47/14; H04L 47/2425; H04W 8/08;
(Continued)

(56) References Cited

U.S. PATENT DOCUMENTS

| | | |
|---|---|---|
| 8,165,132 B2 | 4/2012 | Tsai |
| 8,228,793 B2 | 7/2012 | Kim et al. |

(Continued)

FOREIGN PATENT DOCUMENTS

| | | |
|---|---|---|
| CN | 104619034 | 5/2015 |

OTHER PUBLICATIONS

Li, Yan "Content-Aware Playout and Packet Scheduling for Video Streaming Over Wireless Links". Aug. 2008. pp. 1-11.

*Primary Examiner* — Hardikkumar D Patel (57) ABSTRACT

A processor of a base station of a radio access network may receive a plurality of parameters for a media streaming session for a transmission of a media to an endpoint device, select at least one radio access network resource for the media streaming session based upon the plurality of parameters for the media streaming session, and establish the media streaming session in accordance with the at least one radio access network resource. The plurality of parameters may comprise a type of media parameter, a packet size parameter, and a mobility parameter. The at least one radio access network resource may comprise a number of carriers, a transmission time interval, a number of sub-carriers, a modulation coding scheme, a carrier frequency, or a duration of a reservation.

12 Claims, 3 Drawing Sheets

(52) U.S. Cl.
CPC . *H04N 21/64738* (2013.01); *H04N 21/64746* (2013.01); *H04W 72/1236* (2013.01)

(58) Field of Classification Search
CPC . H04W 72/04; H04W 36/0083; H04W 36/32; H04W 28/22; H04W 72/1236; H04W 72/12; H04W 72/1257; H04N 21/23406; H04N 21/6131; H04N 21/64738; H04N 21/64746; H04Q 7/22; H04M 15/55
See application file for complete search history.

(56) References Cited

U.S. PATENT DOCUMENTS

| | | | |
|---|---|---|---|
| 8,374,083 B2 * | 2/2013 | Shi | H04L 47/10 370/230 |
| 8,693,408 B2 | 4/2014 | Chin et al. | |
| 8,755,405 B2 | 6/2014 | Kovvali et al. | |
| 9,294,410 B2 | 3/2016 | Boden | |
| 9,300,449 B2 * | 3/2016 | Nordin | H04W 72/1273 |
| 9,336,178 B2 | 5/2016 | Haas et al. | |
| 9,413,673 B2 | 8/2016 | Stanwood et al. | |
| 2002/0120749 A1 * | 8/2002 | Widegren | H04L 12/14 709/227 |
| 2005/0052997 A1 | 3/2005 | Montes Linares | |
| 2008/0191816 A1 * | 8/2008 | Balachandran | H04L 47/10 333/24 R |
| 2011/0116460 A1 * | 5/2011 | Kovvali | H04L 47/621 370/329 |
| 2014/0274049 A1 * | 9/2014 | Singh | H04W 36/0083 455/436 |
| 2016/0127215 A1 | 5/2016 | Mani et al. | |

* cited by examiner

MEDIA-AWARE RADIO ACCESS NETWORK PACKET SCHEDULING

The present disclosure relates generally to allocating radio access network resources for media streaming sessions, and more particularly to devices, computer-readable media, and methods for establishing a media streaming session in accordance with at least one radio access network resource that is selected based upon a plurality of parameters for the media streaming session.

BACKGROUND

Media streaming services may interface with mobile applications, or clients residing on users' mobile endpoint devices. For example, music or video may be streamed from servers of a streaming service to mobile endpoint devices. A telecommunications service provider network acts as a pass-through data service which simply transmits and receives Internet Protocol (IP) packets to facilitate media streaming. However, the applications residing on users' mobile endpoint devices, as well as the streaming media servers, may introduce inefficiencies in terms of network traffic that do not account for the burdens placed on a telecommunications service provider network. For example, a streaming music service may involve a mobile endpoint device sending a keep-alive message to a server every minute, notwithstanding that the user may only activate the application three times a week for 30 minutes while the user is exercising.

SUMMARY

In one example, the present disclosure discloses a device, computer-readable medium, and method for establishing a media streaming session in accordance with at least one radio access network resource that is selected based upon a plurality of parameters for the media streaming session. For example, a processor of a base station of a radio access network may receive a plurality of parameters for a media streaming session for a transmission of a media to an endpoint device, select at least one radio access network resource for the media streaming session based upon the plurality of parameters for the media streaming session, and establish the media streaming session in accordance with the at least one radio access network resource. The plurality of parameters may comprise a type of media parameter, a packet size parameter, and a mobility parameter. The at least one radio access network resource may comprise a number of carriers, a transmission time interval, a number of sub-carriers, a modulation coding scheme, a carrier frequency, or a duration of a reservation.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for establishing a media streaming session in accordance with at least one radio access network resource that is selected based upon a plurality of parameters for the media streaming session, e.g., within a radio access network.

In a Long Term Evolution (LTE) radio access network (RAN), a base station (e.g., an eNodeB) includes a packet scheduler. However, RAN resources such as physical resource blocks (PRB), radio resource connections (RRC) per carrier, and multiple carriers for carrier aggregation (CA) may be scheduled inefficiently. For example, network logs may show that typical RAN resource utilization is far less than what is assigned. Most actual LTE connections are small and bursty, such as: Transmission Control Protocol (TCP) SYN/FIN ("synchronize" and "finish") or ACK/NACK ("acknowledge" and "negative acknowledge") flags, ping message, domain name service (DNS) requests, and so forth. Many of these types of communications may be 50 bytes or less. However, the packet scheduler may be unaware if an endpoint device is simply sending a DNS keep alive or whether the endpoint device intends to start a high bit rate streaming video or audio session. Thus, RAN resources may be over-allocated with respect to the small and bursty traffic. In addition, these bursts may hold RAN resources for longer periods of time than necessary and can contribute to network blocking of other users, e.g., at large events, and the triggering of network expansion. In other cases, RAN resources may be under-allocated, such as for high definition streaming video. In such examples, additional RAN resources may be provided to a session, such as additional carriers for carrier aggregation. However, the allocation of additional RAN resources is reactive and based upon observation of past volumes of traffic. This may also lead to over-allocation of RAN resources at the tail end of a session. For example, the transmission of data at a high-bit rate may taper off or end, but may not be detected by the network for a period of time during which the allocation of additional RAN resources persists.

Examples of the present disclosure include an endpoint device, or a server or other third-party device at the other end of a session, e.g., a media streaming session, informing a radio access network packet scheduler of various parameters of the session in order for the packet scheduler to assign RAN resources accordingly. For example, the endpoint device may inform the packet scheduler that a session will be for a particular type of communication, e.g., streaming video, a packet size for packets of the session, whether the session requires a particular level of latency or loss, whether the session is for guaranteed delivery versus best effort traffic, a size/data volume of the media for the session, a duration of the session, e.g., for a live stream, and so forth. However, in one example, certain parameters may be determinable from a parameter which identifies the type of traffic. For instance, the packet scheduler may infer the packet size and/or the latency and loss tolerances for a streaming video or a VoIP session simply by being informed of the nature of the session. For streaming media with generally higher RAN resource demands, the packet scheduler can allocate RAN resources to meet the requested parameters, to the best of its ability. In one example, there may be a negotiation downward in a managed way if the packet scheduler cannot provide or guarantee the level of service in accordance with the requested parameters. With respect to other traffic, such as small data volume and/or bursty traffic, the packet scheduler can allocate RAN resources sufficient to meet the demands of the session, without over-allocating RAN resources that would be unused or wasted. To illustrate, a packet scheduler that is aware of the packet size of the media of a media streaming session may then select a transmission time interval (TTI) based upon the packet size. For instance, for larger packets sizes, the processor may select a longer TTI, e.g., more resource blocks, in order to avoid breaking packets into smaller blocks for radio transmission.

With respect to a media streaming session, parameters of the session that are provided to the packet scheduler may also include whether the endpoint device is going to be physically static or not, and for how long. In one example, the packet scheduler may select a particular frequency band for carrier allocation based upon whether the endpoint device is static or in motion. For instance, the packet scheduler may select a higher frequency band, e.g., a 2.5 GHz band, if the endpoint device is static, or may select a lower frequency band, e.g., a 700-800 MHz band, if the endpoint device is in motion. In particular, for an endpoint device that is presently in motion, while the endpoint device might prefer to use a highest available frequency band (which is capable of conveying more symbols in a given time), the motion of the endpoint device may make the session more prone to transmission errors. Thus, for instance, a higher frequency band may be less useful than a lower band that would cause fewer errors. For example, if a carrier at 2.5 GHz is allocated to a session, it may not work as intended for latency objectives, loss objectives, and the like. Therefore, it may be better to release the 2.5 GHz carrier and utilize a different carrier at 700-800 MHz, which may result in a greater throughput due to less transmission errors. Similarly, an endpoint device may prefer to utilize a 64-quadrature amplitude modulation (64-QAM) coding scheme for each of the PRBs allocated. However, a motion of the endpoint device may cause a greater number of transmission errors using 64-QAM, which may make 16-QAM a better choice for the packet scheduler to select if the packet scheduler is aware that the endpoint device is in motion. For instance, if the packet scheduler is aware that the endpoint device is in motion or will be in motion and wants to download a movie within a 5 minute time period, the packet scheduler may determine that based upon the size of the movie and the time available, that the movie can still be downloaded at 16-QAM on a single carrier with a given number of PRBs. It should be noted that as referred to herein, the term "stationary" may refer to an endpoint device that is actually at rest, or an endpoint device that sufficiently close to being considered "at rest" (e.g., limited to a small geographic area or where the motion is relatively slow). For example, an endpoint device that is moving below a threshold speed, e.g., less than a walking speed such as one meter per second, less than 2 meters per second, etc. may be considered to be "stationary" as opposed to in-motion (e.g., motion relating to travelling in a vehicle such as a car, a train or a bus) in one example of the present disclosure.

Another parameter provided to the packet scheduler, e.g., with regard to a streaming media session, may indicate whether the option for buffering is available (e.g., for pre-recorded content). If so, the packet scheduler may effectively jam the content to the endpoint device in a short period of time with greater RAN resources, and then free such RAN resources when the transmission is completed. For instance, the packet scheduler may allocate multiple carriers to the session (carrier aggregation), may utilize a higher data rate encoding scheme, e.g., 64-quadrature amplitude modulation (64-QAM) versus 16-QAM, may allocate more physical resource blocks (PRBs) to the session, may utilize a greater number of sub-carriers per carrier (e.g., 24 versus 12), and so forth. On the other hand, if the packet scheduler is informed that the session is for a real time stream, the packet scheduler then cannot jam/buffer the stream to the endpoint device in a large block. As such, the allocation of more RAN resources may be unnecessary and would be better left unused or allocated to another session for a different endpoint device.

Thus, in accordance with the present disclosure, the allocation of RAN resources for a media streaming session may be based upon three primary parameters: a packet size, a type of media, e.g., whether the session is for real time streaming or stored media, and whether the endpoint device is stationary or in motion. An additional parameter may include whether the option of buffering is available at an endpoint device, and in what capacity. Further parameters may include whether the traffic is bursty, the latency and loss tolerances, etc. In response, the packet scheduler may select a number of physical resource blocks (PRBs), a transmission time interval (TTI) (e.g., a number of sequential resource blocks), a modulation coding scheme for the resource blocks (MCS) (includes the modulation rate), a number of carrier(s), a frequency band of the carrier(s), a number of sub-carriers (e.g., 12 or 24 per carrier), and a time period of the reservation.

In one example, the present disclosure may provide for different default quality of service (QoS) class identifier (QCI) bearers, depending upon the type of session. For instance, for video streaming, there may be a first type of default bearer that includes a selected number of RAN resources, such as a particular number of carriers, resource blocks per carrier, etc. However, for sessions with bursty traffic and/or control communications, a different default bearer with smaller/tighter RAN resources may be provided. In one example, the parameters of the session may therefore be represented by a QCI indicator or class identifier that is included in a communication from the endpoint device to the packet scheduler at or before the start of a session, which may then be translated into a default bearer/default set of RAN resources. These and other aspects of the present disclosure are discussed in greater detail below in connection with the examples of FIGS. 1-3.

It should be noted that as referred to herein, the term "session" includes a sequence or flow, comprising one or more packets, segments, datagrams, frames, cells, protocol data units, service data unit, bursts, and so forth, as well as control and management communications related to the establishment, continuity, and termination of the session. The particular terminology or types of data units involved may vary depending upon the underlying network technology. Thus, the term "packet" is intended to refer to various types of data units that may comprise a session or flow. As also referred to herein, a media streaming session may include both real-time or live streams, as well as the transmission of previously recorded media over a network. In addition, the terms "configure," and "reconfigure" may refer to programming or loading a computing device with computer-readable/computer-executable instructions, code, and/ or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Figure 1:
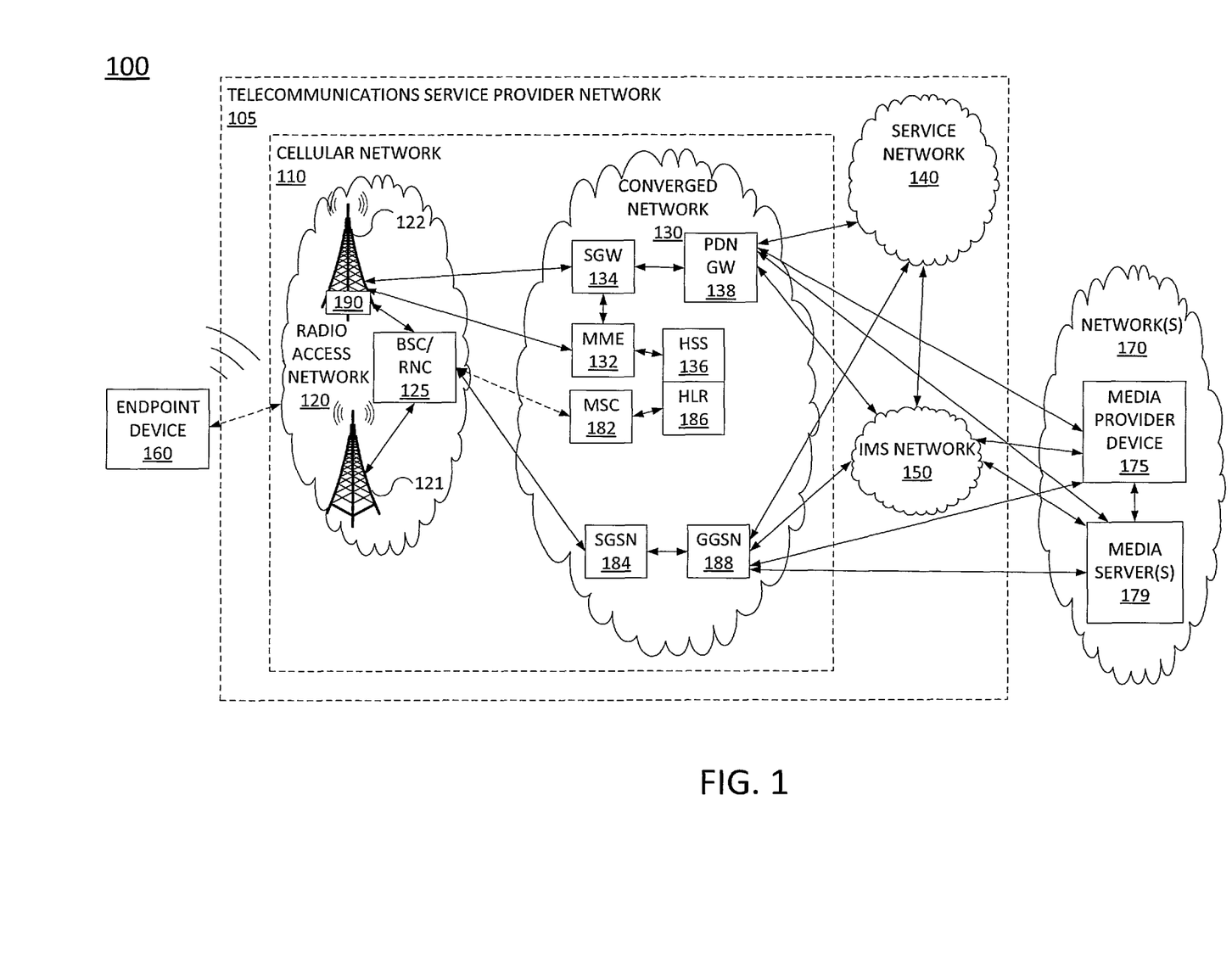
FIG. 1 illustrates an example system related to the present disclosure.

To better understand the present disclosure, FIG. 1 illustrates an example network, or system 100 that may implement examples of the present disclosure for establishing a media streaming session in accordance with at least one radio access network resource that is selected based upon a plurality of parameters for the media streaming session. In one example, the system 100 includes a telecommunications service provider network 105. The telecommunications service provider network 105 may comprise a cellular network 110, a service network 140, and an IP Multimedia Subsystem (IMS) network 150. The system 100 may further include other networks 170 connected to the telecommunications service provider network 105. As shown in FIG. 1, the system 100 may connect endpoint device 160 with media provider device 175 and media servers 179 in networks 170. The endpoint device 160 may comprise a cellular telephone, a smartphone, a tablet computing device, a laptop computer, a pair of computing glasses, a wireless enabled wristwatch, or any other cellular-capable mobile telephony and computing device (broadly, an "endpoint device"). In one example, endpoint device 160 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like over various frequency bands.

In one example, the cellular network 110 comprises a radio access network 120 and a converged network 130, e.g., a cellular core network with components for 2G-4G and beyond architectures. For example, as illustrated in FIG. 1, radio access network 120 may include Universal Mobile Telecommunications System (UMTS) terrestrial radio access network (UTRAN), evolved UTRAN (eUTRAN), and Global System for Mobile communication (GSM) radio access network (GRAN)/base station subsystem (BSS) components, while converged network 130 may include evolved packet core (EPC) network components, and network switching subsystem (NSS)/GSM core network and/or General Packet Radio Service (GPRS) core network components. For example, component 121 in radio access network 120 may comprise a base transceiver station (BTS) and a NodeB, e.g., a base station site with both 2G and 3G components. Component 122 may comprise a BTS, NodeB, and an eNodeB. In other words, component 122 may comprise a base station site with 2G, 3G, and 4G/LTE components. As illustrated in FIG. 1, radio access network 120 further includes a base station controller (BSC)/radio network controller (RNC) 125, which may perform a variety of wireless network management related tasks such as wireless channel assignments, determining transmission power levels, controlling handovers from one base station to another base station, concentrating multiple signals from endpoint devices for onward transmission to other portions of the radio access network 120, or converged network 130, and to perform other functions. In the present example, BSC/RNC 125 may coordinate 2G and 3G communications such as GSM/TDMA communications, WCDMA or CDMA2000 communications, and the like via components 121 and 122.

In one example, converged network 130 provides various functions that support wireless services in the 2G-4G/LTE environment. For instance, network devices Mobility Management Entity (MME) 132 and Serving Gateway (SGW) 134 provide various functions for LTE-based communications. For example, MME 132 is the control node for the LTE access networks, such as eUTRAN portions of radio access network 120 (e.g., eNodeBs). In one embodiment, MME 132 is responsible for user equipment (UE)/endpoint device tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., service network 140, IMS network 150, networks 170, and the like. The packet data network gateway 138 is also referred to as a PDN gateway, a PDN GW or a PGW. In one example, the LTE/EPC portions of converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for radio access network 120. The converged network 130 may further include one or more home location registers (HLRs), such as HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, MSC 182 may be designated to serve and administer a first coverage area including radio access network 120. Thus, MSC 182 may maintain, e.g., in a VLR, user profile records for endpoint devices currently serviced by base stations within the portion of the network that is the responsibility of MSC 182 (e.g., endpoint device 160).

Converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to MSC 182, SGSN 184 may have specific coverage areas and be assigned to handle specific wireless access networks of the system 100. A GGSN refers to a network node responsible for the interworking between a GPRS network (e.g., components of converged network 130 that support GPRS services and functionality) and external packet switched networks, e.g., service network 140, IMS network 150, and networks 170. Thus, FIG. 1 illustrates various connections between GGSN 188 and other components of system 100. In one example, the GPRS portions of converged network 130 may comprise an IP/MPLS.

In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. Media provider device 175 may comprise a server that is accessible to endpoint device 160, and to others endpoint devices via telecommunication service provider network 105 and/or other networks, in order to request different media via media streaming sessions. Media servers 179 may comprise one or more computing devices for providing media to various endpoint devices via media streaming sessions. In one example, media provider device 175 may provide a public interface for endpoint devices to access media streaming services, e.g., to login or provide access credentials, to select available media for a media streaming session, to manage settings associated with the media streaming session, such as picture or audio quality, and so forth. In one example, the media provider device 175 may select an appropriate one of the media servers 179 as a source of the media for the media streaming session and may notify the media server and the endpoint device 160 to establish the session. As illustrated in FIG. 1, a media streaming session may be established between endpoint device 160 and one of the media servers 179 via PDN GW 138 and/or GGSN 188 in converged network 130. For instance, endpoint device 160 may receive data services, including media streaming services and other Internet services, via GPRS or LTE IP/packet-based infrastructure of cellular network 110.

As illustrated in FIG. 1, media servers 179 may connect to telecommunications service provider network 105 via IMS network 150, or via PDN GW 138 and/or GGSN 188 in converged network 130. Thus, in one example, a media streaming session from one of media servers 179 to endpoint device 160 may include the media server sending a stream of IP packets to GGSN 188, which may be forwarded to endpoint device 160 via SGSN 184, BSC/RNC 125, and one of components 121 or 122 (e.g., a NodeB portion of component 121 or component 122). In another example, a media streaming session from one of media servers 179 to endpoint device 160 may include the media server sending a stream of IP packets to PDN GW 138, which may be forwarded to endpoint device 160 via SGW 124, and component 122 (e.g., an eNodeB portion of component 122). In one example, media provider device 175 and media servers 179 may each comprise a computing system, such as computing system 300 depicted in FIG. 3, specifically configured to perform various steps, functions, and/or operations in connection with examples of the present disclosure for establishing a media streaming session in accordance with at least one radio access network resource that is selected based upon a plurality of parameters for the media streaming session.

As mentioned above, component 122 may comprise an eNodeB. In accordance with the present disclosure, component 122 may also include a packet scheduler 190. For instance, base station equipment for the eNodeB aspects of component 122 may include the packet scheduler 190, which may be responsible for such things as maximizing the throughput of component 122 based upon the different channel conditions encountered by different endpoint devices and the traffic loads of the respective endpoint devices, guaranteeing a fair allocation of RAN resource to different sessions for different endpoint devices, reducing backlogs, helping to minimize latency, packet loss, etc. across all sessions, and so forth. In accordance with the present disclosure, the packet scheduler 190 may be configured to allocate RAN resources of RAN 120, and for component 122 in particular, for a media streaming session, e.g., for endpoint device 160. In one example, the allocation may be based upon three primary parameters: a packet size, a type of media, e.g., whether the session is for real time streaming or stored media, and whether the endpoint device 160 is stationary or in motion.

In one example, the parameters may be received by the packet scheduler 190 from the endpoint device 160 in a communication at or prior to the start of the media streaming session. For example, the communication may comprise a signaling message from the endpoint device 160 sent on a physical uplink control channel (PUCCH) and/or on a common control channel (CCCH), a dedicated control channel (DCCH), a physical random access channel (PRACH), or the like, in the uplink. Additional parameters may include whether the option of buffering is available at the endpoint device 160, whether the traffic of the session is bursty, the latency and loss tolerances, etc. In the example of FIG. 1, endpoint device 160, media provider device 175, or one of media servers 179 may initiate a media streaming session, e.g., between endpoint device 160 and the one of the media servers 179. However, prior to the conveying of the media, the endpoint device 160 may send a message to the packet scheduler 190 with the various parameters for the session. In one example, one or more of the parameters may be provided by the media provider device 175 or the one of media servers 179 to the endpoint device 160, which the endpoint device 160 may then include in the message sent to the packet scheduler 190. For instance, the endpoint device may obtain the size/data volume of the media, an indication of whether the media may be transmitted in bulk, or whether there is a maximum rate at which the one of media servers 179 can transfer the media, and so forth.

Figure 2:
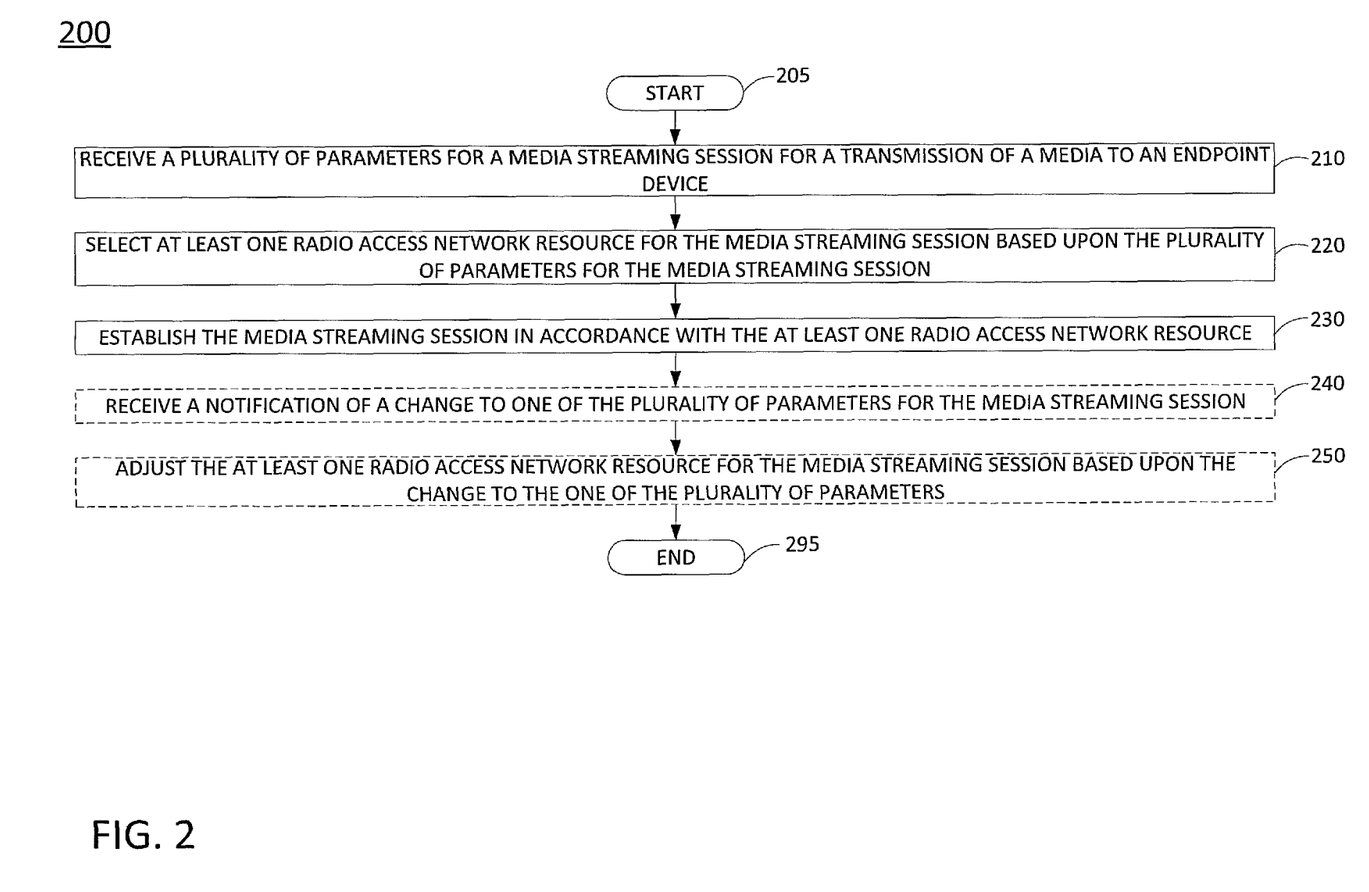
FIG. 2 illustrates a flowchart of an example method for establishing a media streaming session in accordance with at least one radio access network resource that is selected based upon a plurality of parameters for the media streaming session.

In response to receiving the various parameters, the packet scheduler 190 may allocate various RAN resources to the session, such as: a number of physical resource blocks (PRBs), a transmission time interval (TTI) for the resource blocks, a modulation coding scheme for the resource blocks (MCS) (includes the modulation rate), a number of carrier(s), a frequency band of the carrier(s), a number of sub-carriers, a time period of the reservation for the session via component 122, and so forth. In one example, the packet scheduler 190 may comprise a computing system, such as computing system 300 depicted in FIG. 3, specifically configured to perform various steps, functions, and/or operations for establishing a media streaming session in accordance with at least one radio access network resource that is selected based upon a plurality of parameters for the media streaming session, in accordance with the present disclosure. For example, packet scheduler 190 may be configured to perform one or more steps, functions, or operations in connection with the example method 200 described below.

It should be noted that the system 100 has been simplified. In other words, the system 100 may be implemented in a different form than that which is illustrated in FIG. 1. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of radio access network 120, converged network 130, and IMS network 150 are omitted for clarity, including gateways or border elements providing connectivity between such networks, internal routers within converged network 130, and so on. Similarly, due to the relatively large number of connections available between devices in the system 100, various links between MME 132, SGW 134, components 121 and 122, SMSC 180, PDN GW 138, and other components of system 100 are also omitted for clarity.

In addition, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. Similarly, although the media provider device 175 and media servers 179 are illustrated as components of other networks 170, in other examples, any one or more of these components may be deployed in a different configuration. For example, media provider device 175 and/or media servers 179 may be deployed within service network 140, IMS network 150, and/or converged network 130. In another example, media provider device 175 and one of media servers 179 may be combined into a single component. Thus, these and other modifications are all contemplated within the scope of the present disclosure.

FIG. 2 illustrates a flowchart of an example method 200 for establishing a media streaming session in accordance with at least one radio access network resource that is selected based upon a plurality of parameters for the media streaming session, in accordance with the present disclosure. In one example, steps, functions and/or operations of the method 200 may be performed by a radio access network-based device, such as packet scheduler 190, or packet scheduler 190 in conjunction with other components of the system 100. In one example, the steps, functions, or operations of method 200 may be performed by a computing device or system 300, and/or processor 302 as described in connection with FIG. 3 below. For instance, computing device or system 300 may represent a packet scheduler the present disclosure. For illustrative purposes, the method 200 is described in greater detail below in connection with an example performed by a processor, such as processor 302. The method begins in step 205 and proceeds to step 210.

At step 210, the processor receives a plurality of parameters for a media streaming session for a transmission of a media to an endpoint device, e.g., via a radio access network (RAN) and/or a cellular base station of the RAN. For instance, the processor may comprise a processor of such a RAN base station. In one example, the plurality of parameters for the media streaming session is received in a request to establish the media streaming session. In one example, the media streaming session is between the endpoint device and a server providing the media of the media streaming session. In one example, the plurality of parameters is received from the endpoint device. For instance, the endpoint device may send a message to establish the media streaming session using an uplink control channel of the radio access network to provide the plurality of parameters to the processor. However, in another example, the parameters may be received from the server providing the media.

In one example, the parameters include: a type of media parameter, a packet size parameter, and a mobility parameter. For example, the type of media parameter indicates a type of the media of the media streaming session, the packet size parameter indicates a packet size for packets of the media streaming session, and the mobility parameter indicates whether the endpoint device is mobile or stationary. In one example, the parameter indicating the type of media indicates at least one of: a category of the media, e.g., video, audio, gaming, VoIP, photo album, social media, etc., whether the media is a real-time streaming media or a pre-recorded media, a size of the media, a maximum latency requirement, or a maximum packet loss requirement. In one example, the plurality of parameters further comprises an indication of the capacity of the endpoint device to buffer the media of the media streaming session and/or a capacity of the media server to provide the media at a high data rate (e.g., at a rate in excess of a rate at which the media would be presented on the endpoint device, and which would therefore necessitate buffering at the endpoint device or at an intermediate network device).

At step 220, the processor selects at least one RAN resource for the media streaming session based upon the plurality of parameters for the media streaming session. The at least one RAN resource may comprise, for example, a number of carriers, a carrier frequency (or frequencies, for multiple carriers), a transmission time interval (TTI), e.g., a number of resource blocks or time slots, a modulation coding scheme (MCS), a number of sub-carriers per carrier, or a duration of a reservation. For instance, the processor may select a higher frequency band, e.g., a 2.5 GHz band, if the endpoint device is static, or may select a lower frequency band, e.g., a 700-800 MHz band, if the endpoint device is in motion. Alternatively, or in addition, if the endpoint device is in motion the processor may select a lower symbol rate MCS, e.g., 16-QAM as compared to if the endpoint device is stationary, e.g., 64-QAM. In one example, the processor may select a TTI based upon the packet size that is indicated in the plurality of parameters. For instance, for larger packets sizes, the processor may select a longer TTI, e.g., more resource blocks, in order to avoid breaking packets into smaller blocks for radio transmission.

In one example, if the plurality of parameters indicates that the option for buffering is available (e.g., for pre-recorded content), the processor may effectively jam the content to the endpoint device in a short period of time with greater RAN resources. For instance, the processor may allocate multiple carriers to the session (carrier aggregation), e.g., as opposed to using a single carrier, may utilize a higher data rate encoding scheme, e.g., 64-quadrature amplitude modulation (64-QAM) versus 16-QAM, may allocate more physical resource blocks (PRBs) to the session, may utilize a higher number of sub-carrier per carrier than other available options (e.g., 24 sub-carriers versus 12 sub-carriers), and so forth. On the other hand, if the packet scheduler is informed that the session is for a real time stream, the packet scheduler may allocate resources that are matched to the media transmission rate, e.g., from the source server, but which do not go beyond such rate such that more RAN resources remain free to allocate to other sessions.

At step 230, the processor establishes the media streaming session in accordance with the at least one RAN resource. For example, the processor may send one or more messages to the endpoint device notifying the endpoint device of the RAN resources selected at step 220. The processor may then cause a cellular base station, e.g., an eNodeB of the processor, to send the media of the media streaming session via one or more carriers in accordance with the RAN resources allocated, e.g., using particular time slots, TTIs, a particular number of sub-carriers, a particular MCS, and so forth. Thus, for example, the endpoint device may tune to a particular carrier, or carriers, during a particular time slot, or time slots, receive signals via such carrier(s), process the received signals in accordance with a number of sub-carriers selected and/or in accordance with a modulation coding scheme selected, and so forth. Following step 230, the method 200 may proceed to step 295 or to optional step 240.

At optional step 240, the processor may receive a notification of a change to one of the plurality of parameters for the media streaming session. For instance, the endpoint device and the server at the other end of the session may agree to reduce a quality of a video stream. For instance, there may be problems at the server end of the connection such that a high bit rate stream of the media cannot be received and presented at the endpoint device without compression artifacts, macroblocking, sound degradation, etc. Thus, the server and the endpoint device may coordinate a downgrade to a lower bit rate stream. In such, case the endpoint device may send a control message to the processor notifying the processor of the parameter change. Various other scenarios may result in the processor receive a notification of a change to one or more other parameters. In one example, the server (or other third-party device) sourcing the media at the other end of the session may notify one or more network components (e.g., deployed in a core cellular network) of the change in one or more parameters, where the one or more network components may then convey the change to the processor.

At optional step 250, the processor may adjust the at least one RAN resource for the media streaming session based upon the change to the one of the plurality of parameters. For instance, optional step 250 may comprise the same or similar operations to those discussed above in connection with steps 220 and 230, only with respect to a now ongoing media streaming session, e.g., selecting a different number of carriers, a different carrier frequency (or frequencies, for multiple carriers), a different transmission time interval (TTI), e.g., a number of resource blocks or time slots, a different modulation coding scheme (MCS), a different number of sub-carriers per carrier, a different duration of a reservation, and so forth.

Following step 230 or optional step 250, the method 200 may proceed to step 295 where the method 200 ends.

It should be noted that the method 200 may be expanded to include additional steps, may be modified to perform different steps, or may omit certain steps. For instance, in one example the processor may downgrade the RAN resources allocated media streaming session due to various triggers, such as congestion in the RAN or in a cellular core network, intra-cell or inter-cell interference, and so forth. In addition, as mentioned above, if the requested parameters for a media streaming session cannot be satisfied, there may be a negotiation with an endpoint device to reach an agreed upon lesser set of RAN resources. Thus, in one example, the method 200 may further include the processor communicating with the endpoint device to agree to RAN resource allocation that is not in accordance with at least one of the parameters received at step 210. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
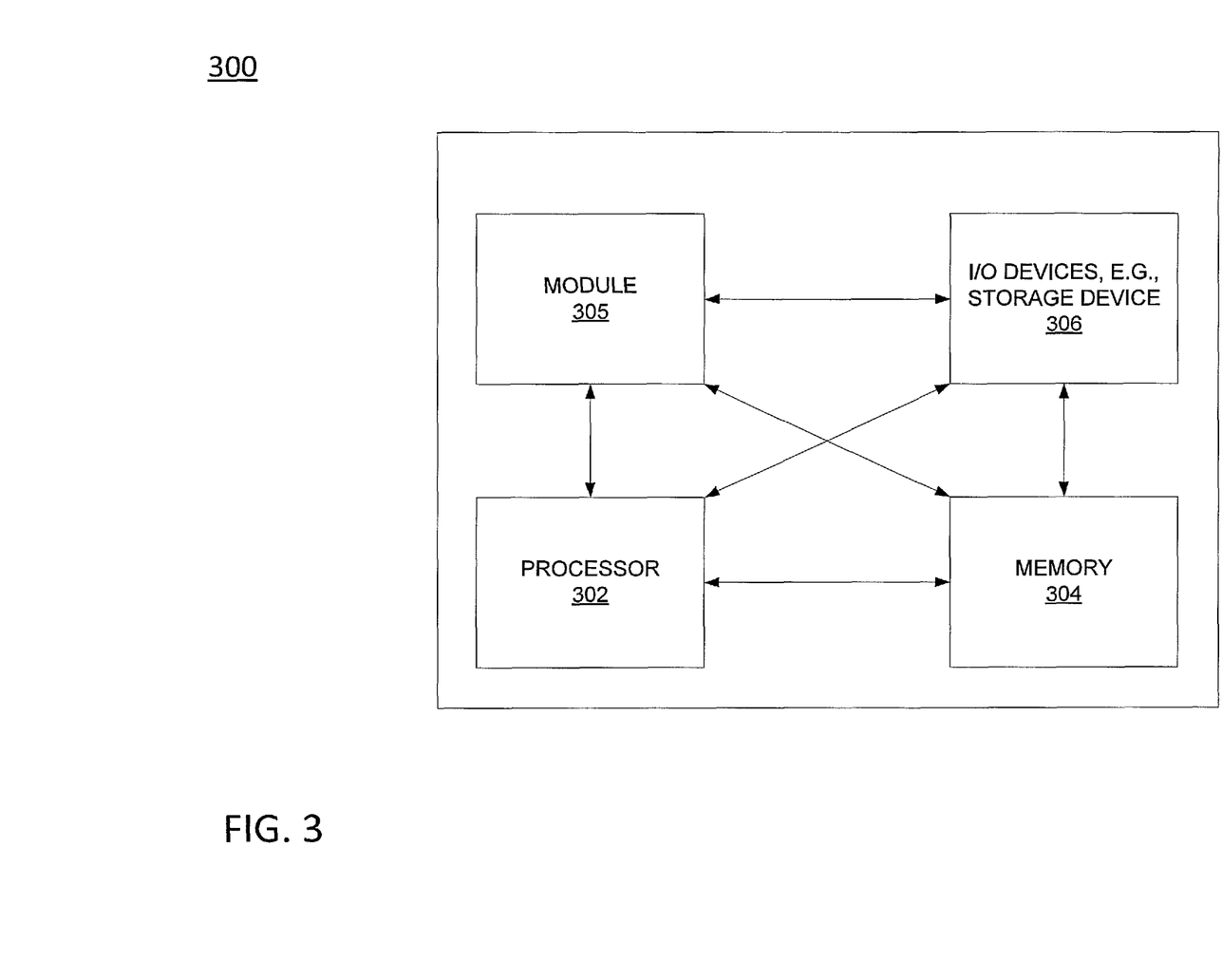
FIG. 3 illustrates an example high-level block diagram of a computer specifically programmed to perform the steps, functions, blocks, and/or operations described herein.

FIG. 3 depicts a high-level block diagram of a computing device specifically programmed to perform the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for establishing a media streaming session in accordance with at least one radio access network resource that is selected based upon a plurality of parameters for the media streaming session, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for establishing a media streaming session in accordance with at least one radio access network resource that is selected based upon a plurality of parameters for the media streaming session (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for establishing a media streaming session in accordance with at least one radio access network resource that is selected based upon a plurality of parameters for the media streaming session (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processor of a base station of a radio access network; and
   a computer-readable medium storing instructions which, when executed by the processor, cause the processor to perform operations, the operations comprising:
      receiving a plurality of parameters for a media streaming session for a transmission of a media to an endpoint device, wherein the plurality of parameters for the media streaming session is received before a start of the media streaming session in a request to establish the media streaming session from the endpoint device, wherein the plurality of parameters comprises:
         a type of media parameter, wherein the type of media parameter specifies the media in the transmission during the media streaming session will be a real-time streaming media or a pre-recorded media;
         a packet size parameter, wherein the packet size parameter specifies a packet size for packets to be used for the transmission during the media streaming session; and
         a mobility parameter, wherein the mobility parameter specifies the endpoint device will be mobile or stationary during the media streaming session;
      selecting at least one radio access network resource for the media streaming session based upon the plurality of parameters in the request to establish the media streaming session, wherein the at least one radio access network resource comprises:
         a number of sub-carriers;
         a modulation coding scheme;
         a carrier frequency; or
         a duration of a reservation;
      establishing the media streaming session in accordance with the at least one radio access network resource;
      receiving, via a control message from the endpoint device, a notification of a change to one of the plurality of parameters for the media streaming session; and
      adjusting the at least one radio access network resource for the media streaming session based upon the change to the one of the plurality of parameters in the notification.

2. The device of claim 1, wherein the media streaming session is between the endpoint device and a server providing the media of the media streaming session.

3. The device of claim 1, wherein the plurality of parameters further comprises:
   an indication of a capacity of the endpoint device to buffer the media of the media streaming session.

4. The device of claim 1, wherein the type of media parameter further indicates at least one of:
   a category of the media;
   a size of the media;
   a maximum latency requirement; or
   a maximum packet loss requirement.

5. A non-transitory computer-readable medium storing instructions which, when executed by a processor of a base station of a radio access network, cause the processor to perform operations, the operations comprising:
   receiving a plurality of parameters for a media streaming session for a transmission of a media to an endpoint device, wherein the plurality of parameters for the media streaming session is received before a start of the media streaming session in a request to establish the media streaming session from the endpoint device, wherein the plurality of parameters comprises:
      a type of media parameter, wherein the type of media parameter specifies the media in the transmission during the media streaming session will be a real-time streaming media or a pre-recorded media;

a packet size parameter, wherein the packet size parameter specifies a packet size for packets to be used for the transmission during the media streaming session; and a mobility parameter, wherein the mobility parameter specifies the endpoint device will be mobile or stationary during the media streaming session;

selecting at least one radio access network resource for the media streaming session based upon the plurality of parameters in the request to establish the media streaming session, wherein the at least one radio access network resource comprises:
 a number of sub-carriers;
 a modulation coding scheme;
 a carrier frequency; or
 a duration of a reservation;

establishing the media streaming session in accordance with the at least one radio access network resource;

receiving, via a control message from the endpoint device, a notification of a change to one of the plurality of parameters for the media streaming session; and adjusting the at least one radio access network resource for the media streaming session based upon the change to the one of the plurality of parameters in the notification.

6. The non-transitory computer-readable medium of claim 5, wherein the plurality of parameters further comprises:
 an indication of a capacity of the endpoint device to buffer the media of the media streaming session.

7. The non-transitory computer-readable medium of claim 5, wherein the type of media parameter further indicates at least one of:
 a category of the media;
 a size of the media;
 a maximum latency requirement; or
 a maximum packet loss requirement.

8. A method comprising:
 receiving, by a processor of a base station of a radio access network, a plurality of parameters for a media streaming session for a transmission of a media to an endpoint device, wherein the plurality of parameters for the media streaming session is received before a start of the media streaming session in a request to establish the media streaming session from the endpoint device, wherein the plurality of parameters comprises:
  a type of media parameter, wherein the type of media parameter specifies the media in the transmission during the media streaming session will be a real-time streaming media or a pre-recorded media;
  a packet size parameter, wherein the packet size parameter specifies a packet size for packets to be used for the transmission during the media streaming session; and
  a mobility parameter, wherein the mobility parameter specifies the endpoint device will be mobile or stationary during the media streaming session;
 selecting, by the processor, at least one radio access network resource for the media streaming session based upon the plurality of parameters in the request to establish the media streaming session, wherein the at least one radio access network resource comprises:
  a number of sub-carriers;
  a modulation coding scheme;
  a carrier frequency; or
  a duration of a reservation;
 establishing, by the processor, the media streaming session in accordance with the at least one radio access network resource;
 receiving, by the processor, via a control message from the endpoint device, a notification of a change to one of the plurality of parameters for the media streaming session; and
 adjusting, by the processor, the at least one radio access network resource for the media streaming session based upon the change to the one of the plurality of parameters in the notification.

9. The method of claim 8, wherein the plurality of parameters further comprises:
 an indication of a capacity of the endpoint device to buffer the media of the media streaming session.

10. The method of claim 8, wherein the type of media parameter further indicates at least one of;
 a category of the media;
 a size of the media;
 a maximum latency requirement; or
 a maximum packet loss requirement.

11. The method of claim 8, wherein the media streaming session is between the endpoint device and a server providing the media of the media streaming session.

12. The non-transitory computer-readable medium of claim 5, wherein the media streaming session is between the endpoint device and a server providing the media of the media streaming session.

* * * * *